(12) United States Patent
Ikenishi (10) Patent No.: US 8,637,415 B2
(45) Date of Patent: *Jan. 28, 2014

(54) FLUOROPHOSPHATE GLASS, PRECISION PRESS MOLDING PREFORM, OPTICAL ELEMENT BLANK, OPTICAL ELEMENT AND METHODS OF MANUFACTURING THE SAME

(75) Inventor: Mikio Ikenishi, Tokyo (JP)

(73) Assignee: Hoya Corporation, Tokyo (JP)

( * ) Notice: Subject to any disclaimer, the term of this patent is extended or adjusted under 35 U.S.C. 154(b) by 473 days.

This patent is subject to a terminal disclaimer.

(21) Appl. No.: 12/412,807

(22) Filed: Mar. 27, 2009

(65) Prior Publication Data

US 2009/0247387 A1    Oct. 1, 2009

(30) Foreign Application Priority Data

Mar. 28, 2008  (JP) ................................ 2008-086176
Sep. 5, 2008   (JP) ................................ 2008-228292

(51) Int. Cl.
  *C03C 3/247*    (2006.01)
  *C03C 3/16*     (2006.01)
  *C03C 3/17*     (2006.01)

(52) U.S. Cl.
  USPC ............................ 501/44; 501/48

(58) Field of Classification Search
  USPC .................... 501/44, 45, 46, 47, 48
  See application file for complete search history.

(56) References Cited

U.S. PATENT DOCUMENTS

| | | | |
|---|---|---|---|
| 3,671,276 | A | 6/1972 | Bromer et al. |
| 4,120,814 | A | 10/1978 | Izumitani et al. |
| 4,225,459 | A | 9/1980 | Faulstich et al. |
| 4,427,784 | A | 1/1984 | Nakamura et al. |
| 4,771,020 | A | 9/1988 | Omata et al. |
| 4,990,468 | A | 2/1991 | Komiya et al. |
| 5,017,520 | A | 5/1991 | Otsuka et al. |
| 5,635,109 | A | 6/1997 | Otsuka |
| 5,755,998 | A | 5/1998 | Yamazaki et al. |
| 7,192,897 | B2 | 3/2007 | Yamane et al. |
| 7,595,272 | B2 * | 9/2009 | Ikenishi et al. ........ 501/48 |
| 8,158,541 | B2 | 4/2012 | Ikenishi et al. |
| 8,206,830 | B2 | 6/2012 | Zou et al. |
| 8,261,579 | B2 | 9/2012 | Ikenishi et al. |
| 8,354,352 | B2 | 1/2013 | Ikenishi |
| 2005/0188724 | A1 | 9/2005 | Ikenishi et al. |
| 2005/0247658 | A1 | 11/2005 | Renz |
| 2006/0223689 | A1 | 10/2006 | Ikenishi et al. |
| 2007/0027017 | A1 | 2/2007 | Hachitani |
| 2007/0060464 | A1 | 3/2007 | Ikenishi et al. |
| 2007/0096067 | A1 * | 5/2007 | Zou et al. ............. 252/587 |
| 2008/0132400 | A1 * | 6/2008 | Hachitani ............. 501/44 |
| 2009/0247386 | A1 * | 10/2009 | Ikenishi .............. 501/44 |
| 2009/0247387 | A1 | 10/2009 | Ikenishi |
| 2009/0247388 | A1 * | 10/2009 | Ikenishi .............. 501/44 |
| 2009/0298668 | A1 * | 12/2009 | Ikenishi .............. 501/44 |
| 2009/0314033 | A1 * | 12/2009 | Zou et al. ............. 65/60.1 |
| 2009/0325774 | A1 | 12/2009 | Ikenishi |
| 2010/0113247 | A1 * | 5/2010 | Ikenishi .............. 501/44 |
| 2010/0130246 | A1 | 5/2010 | Biertumpfel et al. |
| 2012/0111061 | A1 | 5/2012 | Ikenishi |

FOREIGN PATENT DOCUMENTS

| | | |
|---|---|---|
| DE | 3609803 A1 | 10/1986 |
| DE | 3634674 A1 | 4/1987 |
| DE | 10-2006-033434 A1 | 2/2007 |
| EP | 0 709 345 A | 5/1996 |
| EP | 1516862 A1 | 3/2005 |
| EP | 2019087 A1 | 1/2009 |
| JP | 49-130409 A | 12/1974 |
| JP | 53-105517 A | 9/1978 |
| JP | 53-132014 A | 11/1978 |
| JP | 55-144448 A | 11/1980 |
| JP | 2-124740 A | 5/1990 |
| JP | 6-157068 A | 6/1994 |
| JP | 07-157330 A | 6/1995 |
| JP | 08-104538 | 4/1996 |
| JP | 08-104538 A | 4/1996 |
| JP | 08-133780 A | 5/1996 |
| JP | 10-139454 A | 5/1998 |
| JP | 11-060267 A | 3/1999 |
| JP | 2000-290025 A | 10/2000 |
| JP | 2001-278636 A | 10/2001 |
| JP | 2003-026424 A | 1/2003 |
| JP | 2003-040645 A | 2/2003 |
| JP | 2005-075687 A | 3/2005 |
| JP | 2005-142037 A | 6/2005 |
| JP | 2005-247658 A | 9/2005 |
| JP | 2006-306706 A | 11/2006 |
| JP | 2007-055883 A | 3/2007 |
| JP | 2007-76958 A | 3/2007 |

(Continued)

OTHER PUBLICATIONS

Japanese Office Action dated Apr. 27, 2010 in corresponding Japanese application No. 2008-228292.
U.S. Office Action issued Mar. 1, 2013 in related U.S. Appl. No. 13/146,431.
Final Office Action, dated Nov. 23, 2012, issued by the United States Patent and Trademark Office in related U.S. Appl. No. 12/412,923.
Notice of Reasons for Rejection dated Nov. 25, 2011, issued by the Japanese Patent Office in Japanese Application No. 2008-228270.
Extended European Search Report dated Jul. 30, 2009 in EP 09250877.9-1218.

(Continued)

*Primary Examiner* — Karl Group
*Assistant Examiner* — Elizabeth A Bolden
(74) *Attorney, Agent, or Firm* — Sughrue Mion, PLLC (57) ABSTRACT

The present invention provides a fluorophosphate glass containing 30 to 50 cationic % of a phosphorus ingredient in terms of $P^{5+}$, the glass having, in a nuclear magnetic resonance spectrum, a resonance spectrum which is generated near a reference frequency of $^{31}P$ and has a shape of Gaussian function. The glass of the invention is reduced in volatility and erosiveness.

22 Claims, 6 Drawing Sheets

(56) References Cited

FOREIGN PATENT DOCUMENTS

| | | | |
|---|---|---|---|
| JP | 2007-099525 A | 4/2007 | |
| JP | 2007-101585 A | 4/2007 | |
| JP | 2007-161944 A | 6/2007 | |
| JP | 2007-176763 A | 7/2007 | |
| JP | 2007-269614 A | 10/2007 | |
| JP | 2008-013378 A | 1/2008 | |
| JP | 2008-509440 A | 3/2008 | |
| JP | 2009-203114 A | 9/2009 | |
| WO | WO 2007/114172 A1 | 10/2007 | |
| WO | WO 2007114172 A1 * | 10/2007 | |
| WO | WO 2008/004648 A1 | 1/2008 | |
| WO | WO 2008004648 A1 * | 1/2008 | |
| WO | 2008111439 A1 | 9/2008 | |

OTHER PUBLICATIONS

International Search Report dated Oct. 27, 2009 in International Application No. PCT/JP2009/064885.
Japanese Office Action dated Apr. 27, 2010 in Application No. JP 2008-228278.
Japanese Office Action dated Dec. 16, 2010 in Japanese Application No. JP 2008-228278.
Notification of Reasons for Refusal dated Apr. 22, 2010 issued in counterpart Japanese Application No. 2008-228270.
Notification of Reasons for Rejection dated Jan. 5, 2011 in Japanese Application No. JP 2008-228270.
U.S. Final Office Action dated Jul. 7, 2011 in related U.S. Appl. No. 12/412,716.
U.S. Final Office Action dated Jul. 7, 2011 issued in related U.S. Appl. No. 12/412,807.
U.S. Non-Final Office Action dated Apr. 15, 2011 issued in related U.S. Appl. No. 12/412,923.
U.S. Non-Final Office Action dated Dec. 10, 2010 in related U.S. Appl. No. 12/412,716.
U.S. Non-Final Office Action dated Dec. 10, 2010 issued in related U.S. Appl. No. 12/412,807.

* cited by examiner

FLUOROPHOSPHATE GLASS, PRECISION PRESS MOLDING PREFORM, OPTICAL ELEMENT BLANK, OPTICAL ELEMENT AND METHODS OF MANUFACTURING THE SAME

FIELD OF THE INVENTION

The present invention relates to a fluorophosphate glass suitable as material of optical elements such as lenses, prisms and filters; a precision press molding preform, an optical element blank, an optical element, each of which is composed of the fluorophosphates glass; and methods of manufacturing the same.

BACKGROUND OF THE INVENTION

A fluorophosphate glass is a glass in high demand because of its properties such as low dispersibility, anomalous dispersibility, and high light transmittance over a wide visible range. The low dispersibility and the anomalous dispersibility are effective for correction of chromatic aberration and the high light transmittance is effective as an optical element material for guiding light having a short wavelength, such as near-ultraviolet light, as well as an optical element material for an imaging optical system. In addition, the fluorophosphate glass can provide a filter function to cut near-ultraviolet light by containing copper ions therein and is thus effective as a material for a color compensating filter of a semiconductor imaging device. Such a fluorophosphate glass is disclosed in JP-A-10-139454.

Although such a fluorophosphate glass is a useful optical material, since it shows high volatility in a high temperature states striae tends to occur when a glass molded article is made from molten glass and therefore it is hard to stably produce high quality glass. In addition, since a volatile ingredient disappear from the molten glass with lapse of time, there also arises a problem that optical characteristics such as a refractive index are easily changed.

To overcome the above problems, JP-A-2007-76958 discloses a method of obtaining glass including sufficiently volatilizing volatile substance from molten glass and then rapidly cooling the molten glass at the point of time when the volatility of the substance is reduced.

This method achieves its required object by putting a difference in refractive index between glasses before and after re-melting in a predetermined range.

Although the invention disclosed in JP-A-2007-76958 provides an excellent technique to overcome the problem inherent in the fluorophosphate glass, there is a need for further improvement from the following standpoints.

In melting of the fluorophosphate glass, a platinum crucible having high corrosion resistance is used to reduce melting of a material of a melting container into glass. However, even when platinum is used, the platinum crucible is slightly eroded by the molten glass and platinum ions are melted and introduced into the glass. Although the temperature of glass is high and accordingly platinum ions are melted and introduced into the glass in a melting process for raw materials or a clarifying process for glass, when the temperature of the glass is decreased to a range of temperature suitable for outflow, the melted and introduced platinum ions are precipitated as particles. Since the platinum ions in the fluorophosphate glass have low solubility, the platinum particles are particularly apt to be precipitated. The precipitated platinum particles are foreign substances acting as a source of scattering of light permeating glass and are the main cause for deterioration of performance of optical elements and glass damage occurring when the glass is irradiated with strong light.

In order to solve such a problem, it is desired not only reducing volatility but also suppressing erosiveness of glass.

SUMMARY OF THE INVENTION

In view of the above circumstances, it is an object of the present invention to provide a fluorophosphate glass with high quality and an optical element using the same.

To achieve the above object, the present invention provides the following items.

1. A fluorophosphate glass comprising 30 to 50 cationic % of a phosphorus ingredient in terms of $P^{5+}$, the glass having, in a nuclear magnetic resonance spectrum, a resonance spectrum which is generated near a reference frequency of $^{31}P$ and has a shape of Gaussian function.

2. The fluorophosphate glass according to item 1, wherein a molar ratio ($O^{2-}/P^{5+}$) of a content of $O^{2-}$ to a content of $P^{5+}$ is equal to or more than 3.5.

3. The fluorophosphate glass according to item 1 or 2, which comprises, in terms of cationic %:
   $P^{5+}$: 30 to 50%,
   $Al^{3+}$: 1 to 30%,
   $Mg^{2+}$: 0 to 15%,
   $Ca^{2+}$: 0 to 15%,
   $Sr^{2+}$: 0 to 15%,
   $Ba^{2+}$: 0 to 40%,
   (wherein the total content of $Mg^{2+}$, $Ca^{2+}$, $Sr^{2+}$ and $Ba^{2+}$ is equal to or more than 20%,)
   $Li^+$: 0 to 30%,
   $Na^+$: 0 to 10%,
   $K^+$: 0 to 10%,
   $Y^{3+}$: 0 to 5%,
   $La^{3+}$: 0 to 5%,
   $Gd^{3+}$: 0 to 5%,
   $Yb^{3+}$: 0 to 5%,
   $B^{3+}$: 0 to 5%,
   $Zn^{2+}$: 0 to 15%, and
   $In^{3+}$: 0 to 5%; and,
   in terms of anionic %:
   $F^-$: 20 to 50%, and
   $O^{2-}$: 50 to 80%.

4. The fluorophosphate glass according to any one of items 1 to 3, which has an Abbe number vd of 68 to 75.

5. The fluorophosphate glass according to any one of items 1 to 4, which has a refractive index nd of 1.52 to 1.61.

6. The fluorophosphate glass according to any one of items 1 to 5, wherein a number density of metal particles contained in the glass and having a particle diameter equal to or more than 10 μm is less than 5 pieces/cm$^3$.

7. A precision press molding preform comprising the fluorophosphate glass according to any one of items 1 to 6.

8. An optical element blank comprising the fluorophosphate glass according to any one of items 1 to 6.

9. An optical element comprising the fluorophosphate glass according to any one of items 1 to 6.

10. A method of manufacturing an optical element, comprising:
   heating the preform according to item 7; and
   subjecting the preform to a precision press molding using a press mold.

11. A method of manufacturing an optical element, comprising:
   grinding and polishing the optical element blank according to item 8.

According to the present invention, there can be provided a fluorophosphate glass which has good optical homogeneity and does not contain foreign substance and an optical element composed of the glass.

DESCRIPTION OF REFERENCE NUMERALS AND SIGNS

1: Upper mold
2: Lower mold
3: Trunk mold
4: Preform
9: Support rod
10: Lower mold/trunk mold holder
11: Quartz tube
12. Heater
13: Pressing rod
14: Thermocouple

BEST MODE FOR CARRYING OUT THE INVENTION

Fluorophosphate Glass

To begin with, a fluorophosphate glass of the present invention will be described in detail.

Phosphate is being commonly used as a raw material of fluorophosphate glass. In addition, in order to make the incorporated amount of fluorine ($F^-$) as an anion ingredient as much as possible, metaphosphate (oxygen atoms/phosphorus atoms=3) having a low ratio of the number of oxygen ($O^{2-}$) atoms to one phosphorus ($P^{5+}$) atom (oxygen atoms/phosphorus atoms) is being used as the phosphate.

However, when the metaphosphate is used to prepare glass, it is believed that, in molten glass, a metaphosphoric acid derived from the raw material and fluorine react with each other to produce fluorophosphoyl ($POF_3$) as a volatile ingredient. On the other hand, it has proved that the amount of generation of the volatile ingredient can be significantly reduced when an atomic ratio of oxygen atoms to one phosphorus atom in the molten glass is adjusted to equal to or greater than 3.5 (oxygen atoms/phosphorus atoms≥3.5). It is believed that this is because, for a phosphoric acid present in the molten glass, biphosphoric acid whose ratio (oxygen atoms/phosphorus atoms) of the number of oxygen ($O^{2-}$) atoms to one phosphorus ($P^{5+}$) atom is 3.5 is more stable than metaphosphoric acid whose ratio (oxygen atoms/phosphorus atoms) of the number of oxygen ($O^{2-}$) atoms to one phosphorus ($P^{5+}$) atom is 3.

By setting a molar ratio ($O^{2-}/P^{5+}$) of the content of $O^{2-}$ to the content of $P^{5+}$ in the fluorophosphate glass to be equal to or more than 3.5, it is possible to suppress generation of the volatile ingredient, which may result in suppression of reactivity and erosiveness of the molten glass.

It is believed that the fluorophosphate glass whose reactivity and erosiveness are suppressed to be an extremely low level according to such a method is different in structure from conventional glasses.

Although it is believed that a glass has an amorphous structure which is generally isotropic, it is believed that slight anisotropy occurs in the glass structure if a product causing volatility and erosiveness is present in the glass structure.

To support this belief, as a method for analyzing anisotropy of glass, a typical nuclear magnetic resonance method was used to measure a nuclear magnetic resonance spectrum of $^{31}P$. The result of measurement showed a clear difference in spectrum between the glass whose volatility and erosiveness are both suppressed to be an extremely low level and the conventional glasses.

In the nuclear magnetic resonance method, a measurement is conducted by rotating a glass sample around an axis perpendicular to a direction of an external magnetic field. The nuclear magnetic resonance spectrum is depicted as a graph in which a horizontal axis represents a chemical shift and a vertical axis represents strength of a nuclear magnetic resonance signal. Symmetry of a shape of the obtained spectrum is changed depending on magnitude of the anisotropy. While the spectrum has a shape of Gaussian function in the case of a glass in which both of volatility and erosiveness are suppressed, the spectrum does not have a shape of Gaussian function but an asymmetrical shape with respect to a peak of the spectrum in the case of a glass in which neither volatility nor erosiveness are suppressed or a glass in which volatility is suppressed but erosiveness not suppressed. Accordingly, in order to obtain a fluorophosphate glass in which volatility and erosiveness are further suppressed, the nuclear magnetic resonance spectrum of $^{31}P$ should be made to have a shape of Gaussian function.

The fluorophosphate glass of the present invention contains 30 to 50 cationic % of a phosphate ingredient in terms of $P^{5+}$, and the glass has, in a nuclear magnetic resonance spectrum, a resonance spectrum which is generated near a reference frequency of $^{31}P$ and has a shape of Gaussian function.

Here, a resonance spectrum generated near a reference frequency of $^{31}P$ refers to a resonance spectrum derived from a nuclear spin of $^{31}P$, which is hereinafter simply referred to as a resonance spectrum.

That is, the resonance spectrum becomes a combination of plurality of Gaussian functions. For example, if a shape of resonance spectrum can be decomposed into two or more Gaussian functions having different peak positions, a shoulder appears or a peak is split in two or more in the resonance spectrum. On the other hand, in a glass in which both of volatility and erosiveness of the glass are suppressed owing to reduction of anisotropy of a glass structure, the resonance spectrum has a shape of single Gaussian function.

Figure 1:
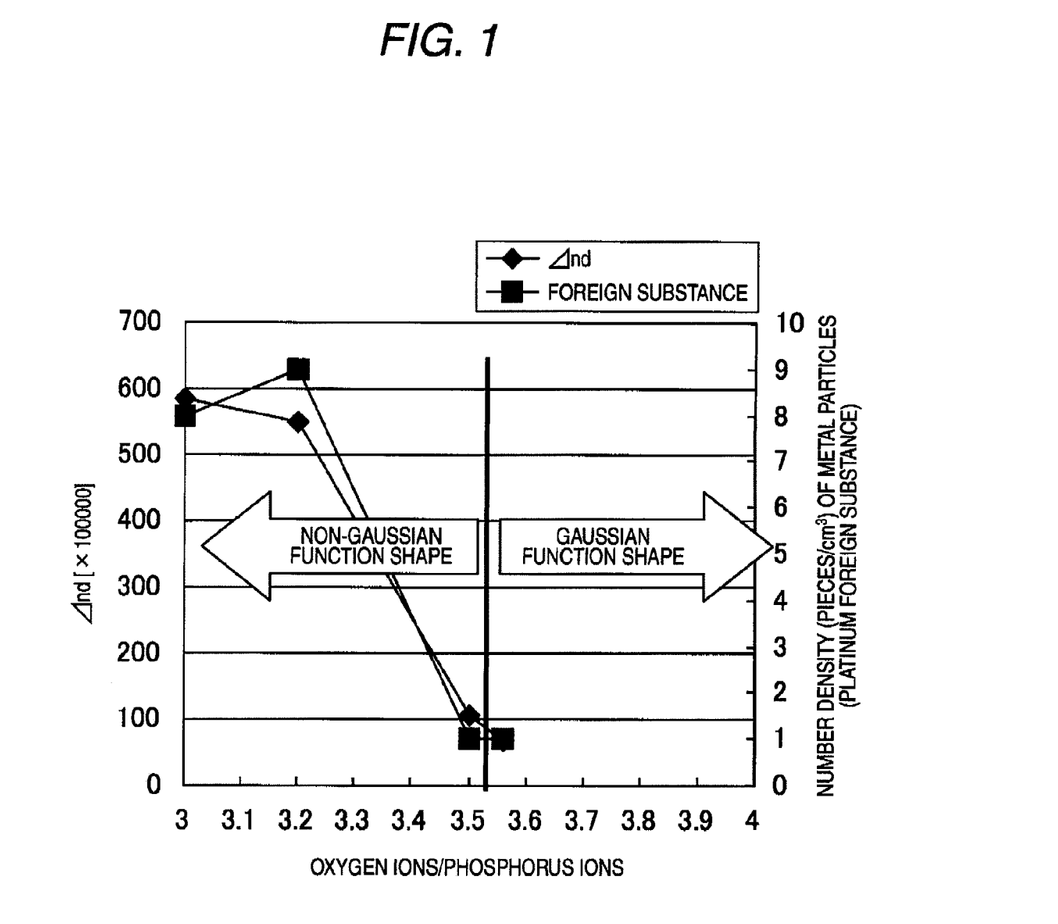
FIG. 1 is a graph showing change of variation Δnd of a refractive index and change of the number density of metal particles (platinum foreign substance) with respect to change of a molar ratio ($O^{2-}/P^{5+}$) of a fluorophosphate glass.

FIG. 1 shows change of variation Δnd of a refractive index and change of the number density of metal particles with respect to change of a molar ratio ($O^{2-}/P^{5+}$). In FIG. 1, a horizontal axis represents a molar ratio ($O^{2-}/P^{5+}$), a vertical axis in the left represents variation Δnd of a refractive index, and a vertical axis in the right represents the number density of metal particles which has a particle diameter equal to or more 10 µm and contained in the glass. The refractive index variation Δnd is an absolute value of a difference between a refractive index nd of 200 g of sample obtained by melting a raw material for 1 hour (referred to as nd(1 h)) and a refractive index nd of 200 g of sample obtained by melting a raw material for three hours (referred to as nd(3 h)). A higher Δnd gives a higher volatility. In addition, a higher number density of metal particles gives a higher erosiveness.

When the molar ratio ($O^{2-}/P^{5+}$) becomes equal to or more than 3.5, volatility is suppressed to reduce the refractive index variation Δnd erosiveness is also suppressed to reduce the number density of metal particles.

In addition, when the molar ratio ($O^{2-}/P^{5+}$) becomes equal to or more than 3.5, a resonance spectrum has a shape of single Gaussian function. On the other hand, when the molar ratio ($O^{2-}/P^{5+}$) becomes less than 3.5, a resonance spectrum has a shape of non-Gaussian function. Accordingly, a fluorophosphate glass whose resonance spectrum has the shape of Gaussian function allows volatility and erosiveness to be suppressed.

Figure 2:
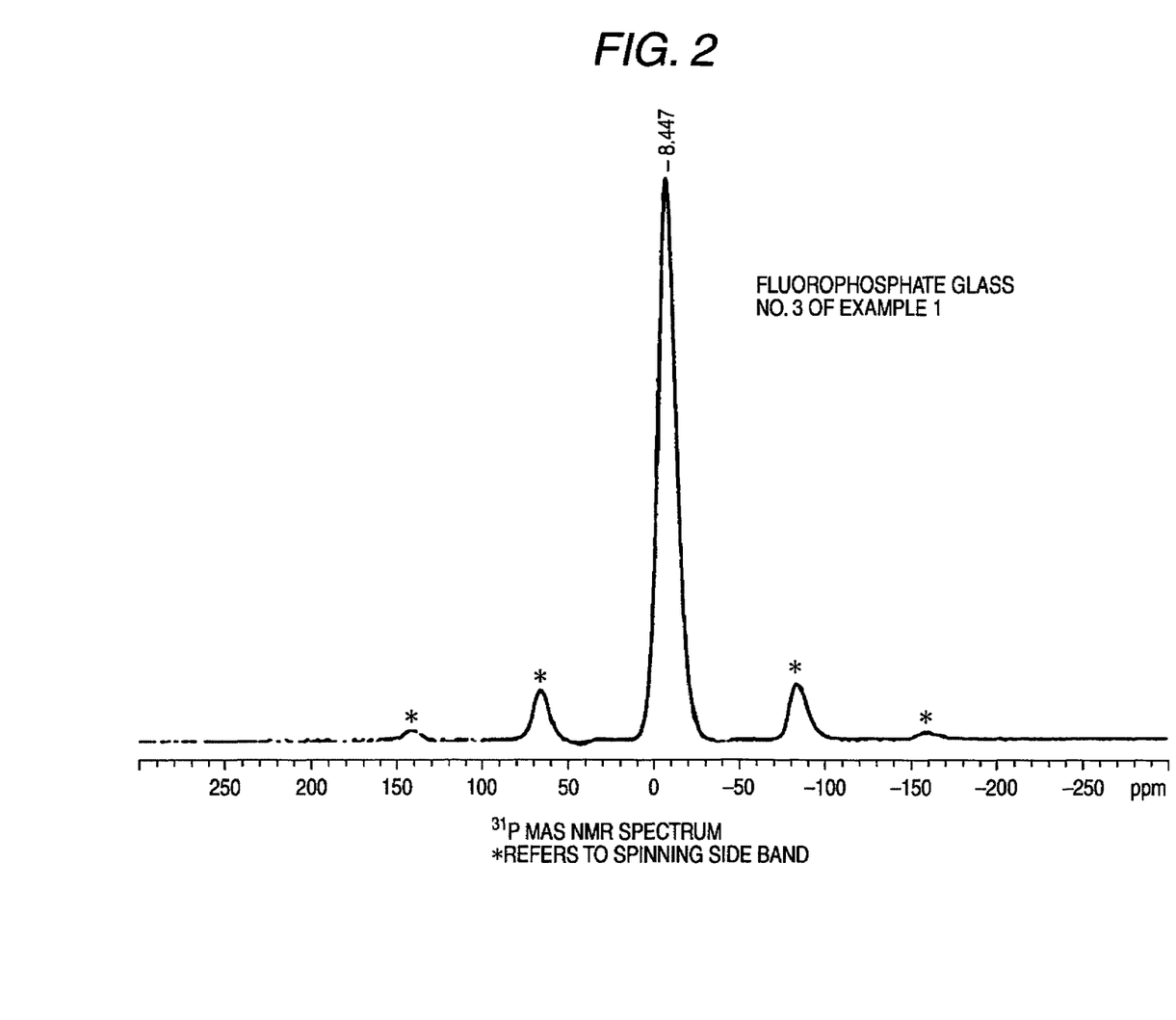
FIG. 2 shows a nuclear magnetic resonance spectrum of $^{31}P$ of the fluorophosphate glass No. 3 (molar ratio ($O^{2-}/P^{5+}$)= 3.5) of Example 1 of the present invention.
Figure 3:
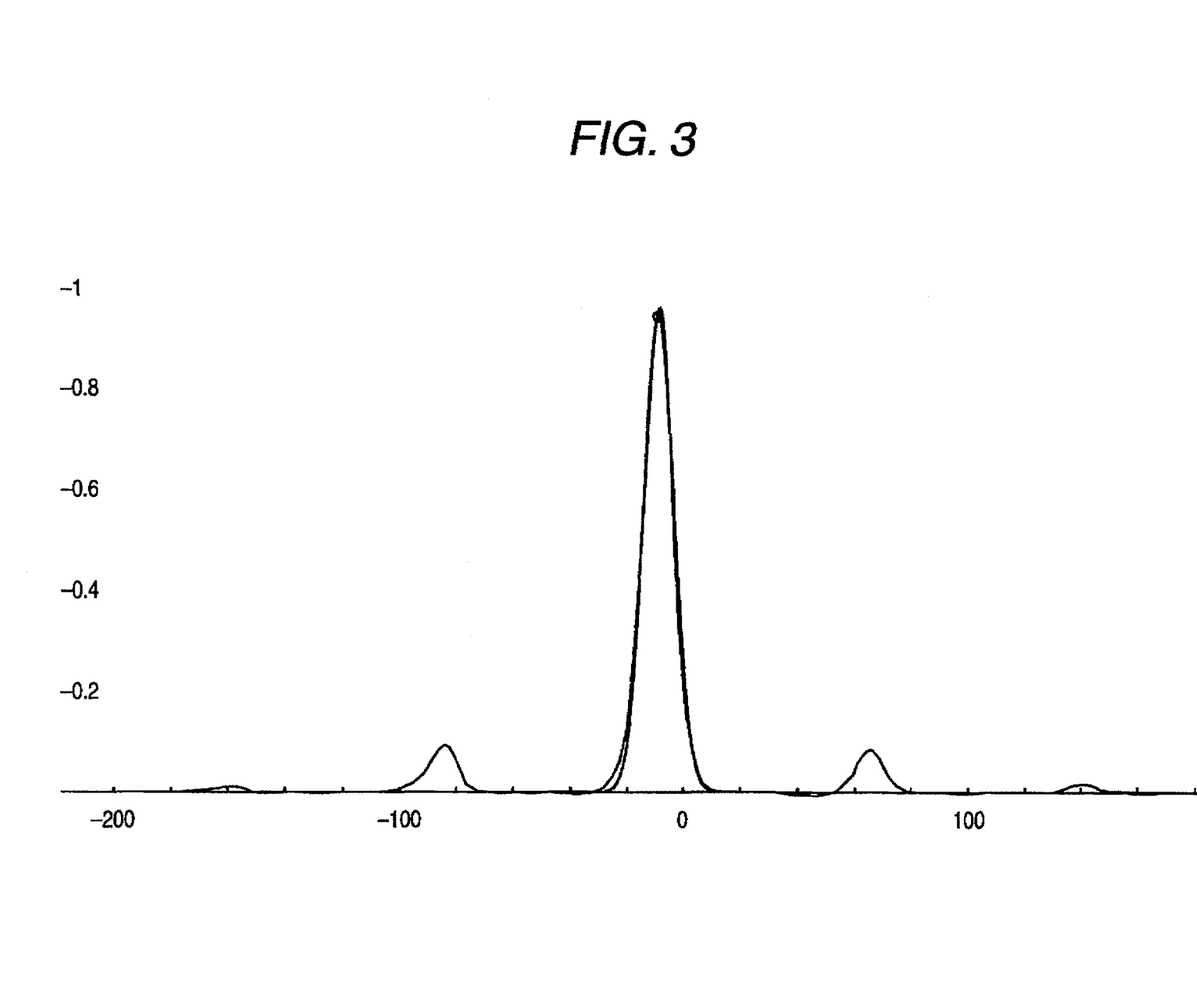
FIG. 3 shows fitting of the $^{31}P$ nuclear magnetic resonance spectrum of FIG. 2 to a Gaussian function.

FIG. 2 shows a resonance spectrum of fluorophosphate glass No. 3 (whose molar ratio ($O^{2-}/P^{5+}$) of Example 1 in which volatility and erosiveness are suppressed, which will be described later, and FIG. 3 shows fitting of the resonance spectrum of FIG. 2 to a Gaussian function.

Figure 4:
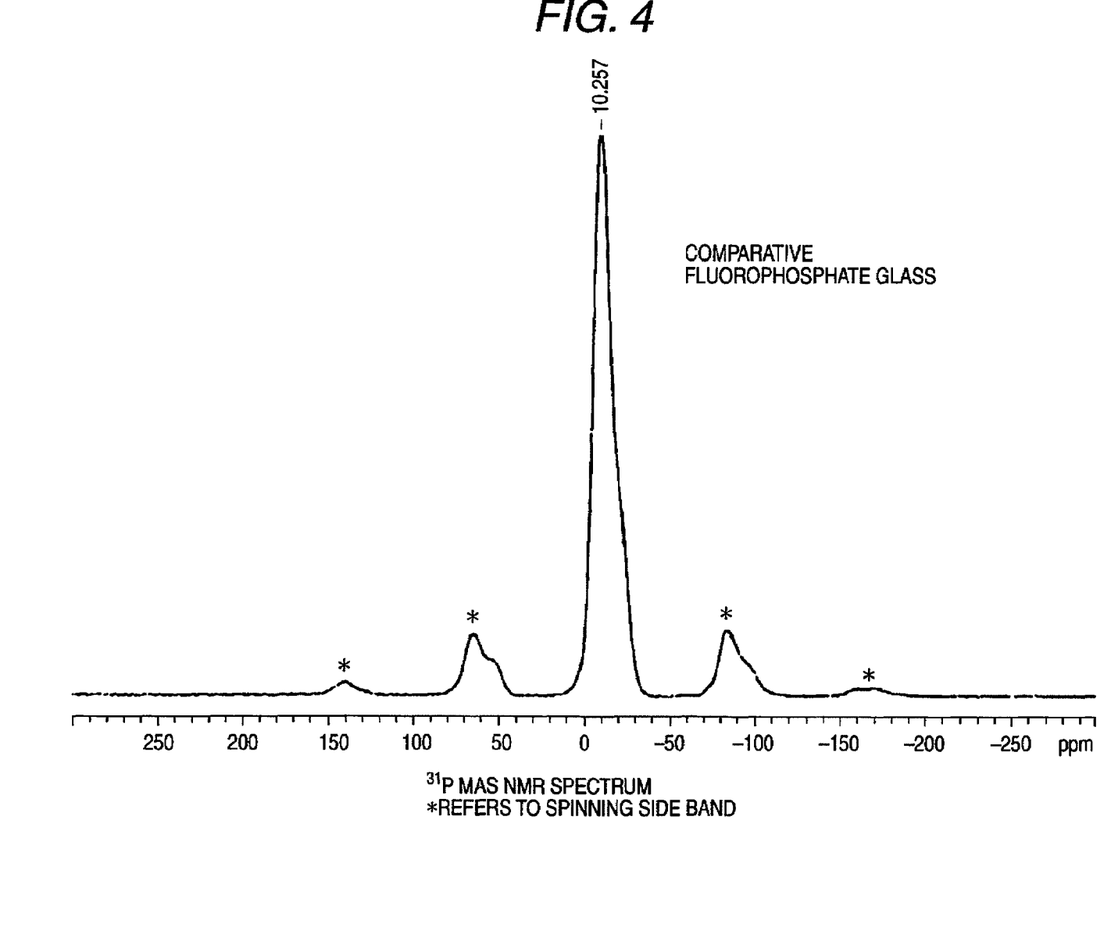
FIG. 4 shows a $^{31}P$ nuclear magnetic resonance spectrum of the comparative fluorophosphate glass (molar ratio ($O^{2-}/P^{5+}$)=3.0).
Figure 5:
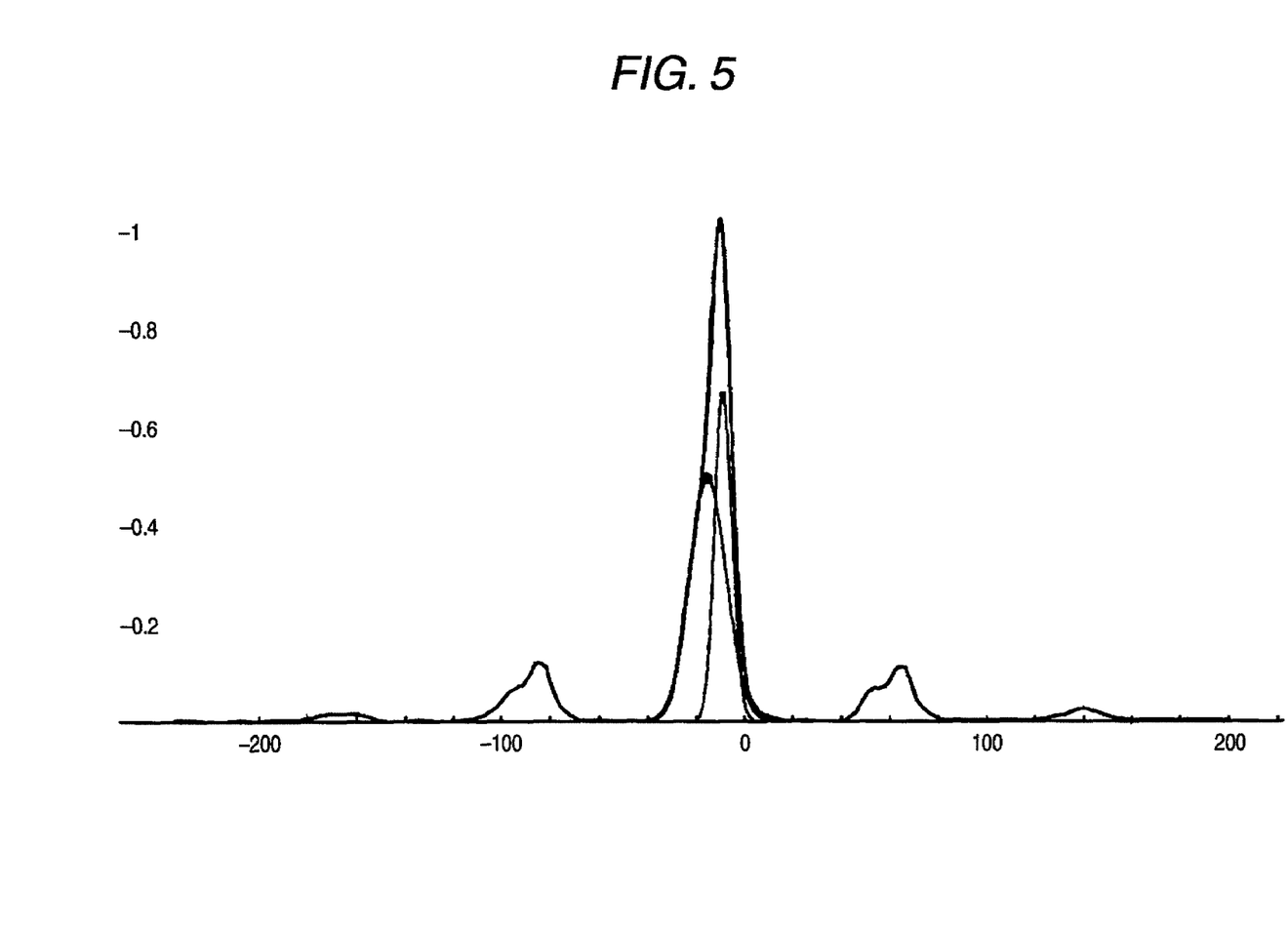
FIG. 5 shows fitting of the $^{31}P$ nuclear magnetic resonance spectrum of FIG. 4 to a Gaussian function.

FIG. 4 shows a resonance spectrum of comparative fluorophosphate glass (whose molar ratio ($O^{2-}/P^{5+}$) showing volatility and erosiveness, which will be described later, and FIG. 5 shows fitting of the resonance spectrum of FIG. 4 to a Gaussian function.

As can be apparently seen from FIG. 3, the resonance spectrum of the fluorophosphate glass in which both of volatility and erosiveness are suppressed has a shape represented by a single Gaussian function. On the other hand, as can be apparently seen from FIG. 5, the resonance spectrum of the fluorophosphate glass showing volatility and erosiveness has a shape represented by a combination of two Gaussian functions having different peak positions, and it cannot be represented by a single Gaussian function.

Incidentally, in FIGS. 2 to 5, two peaks which are called "spinning side band" are produced at both sides of the resonance peak, but these peaks do not have a direct effect on a shape of resonance spectrum.

Such a correspondence relation between the volatility/erosiveness and the nuclear magnetic resonance spectrum is applicable for a fluorophosphate glass having a content of $P^{5+}$ of 30 to 50 cationic %.

Incidentally, from the above-mentioned reason, the molar ratio ($O^{2-}/P^{5+}$) of the content of $O^{2-}$ to the content of $P^{5+}$ in the glass structure may be controlled to be equal to or more than 3.5 in order that the resonance spectrum has a shape of Gaussian function.

In order to further suppress the volatility and erosiveness, the molar ratio ($O^{2-}/P^{5+}$) is preferably equal to or more than 3.51, more preferably equal to or more than 3.54, furthermore preferably equal to or more than 3.55.

It is preferable in terms of glass composition that the fluorophosphate glass of the present invention contains: in terms of cationic %,
$P^{5+}$: 30 to 50%,
$Al^{3+}$: 1 to 30%,
$Mg^{2+}$: 0 to 15%,
$Ca^{2+}$: 0 to 15%,
$Sr^{2+}$: 0 to 15%,
$Ba^{2+}$: 0 to 40%,
(in which the total content of $Mg^{2+}$, $Ca^{2+}$, $Sr^{2+}$ and $Ba^{2+}$ is equal to or more than 20%,)
$Li^+$: 0 to 30%,
$Na^+$: 0 to 10%,
$K^+$: 0 to 10%,
$Y^{3+}$: 0 to 5%,
$La^{3+}$: 0 to 5%,
$Gd^{3+}$: 0 to 5%,
$Yb^{3+}$: 0 to 5%,
$B^{3+}$: 0 to 5%,
$Zn^{2+}$: 0 to 15%, and
$In^{3+}$: 0 to 5%; and,
in terms of anionic %,
$F^-$: 20 to 50%, and
$O^{2-}$: 50 to 80%.

Next, action of the ingredients and the preferred reason for the composition range will be described. In the following description, the contents of cation ingredients and the total contents thereof are represented by cationic % unless otherwise stated, and the contents of anion ingredients and the total contents thereof are represented by anionic % unless otherwise stated.

Incidentally, "containing 0% of a certain ingredient X" means that the content of the ingredient X is 0%, and namely, it means that the ingredient X is not contained.

$P^{5+}$ is an important essential ingredient acting as a network former in the glass. The content of $P^{5+}$ is set to be equal to or more than 30% in order to secure stability of the glass. On the other hand, the content of $P^{5+}$ is set to be equal to or less than 50% in order to suppress volatility and erosiveness by the nuclear magnetic resonance characteristic. The content of $P^{5+}$ set to be equal to or less than 50% is suitable for setting the molar ratio ($O^{2-}/P^{5+}$) to be equal to or more than 3.5. When the content of $P^{5+}$ is set to be equal to or less than 50%, the content of $O^{2-}$ may be diminished while maintaining the molar ratio ($O^{2-}/P^{5+}$) to be equal to or more than 3.5. This means possibility of increase in the content of $F^-$ and possibility of further lowering of dispersibility with the increase of the content of $F^-$. From this standpoint, the content of $P^{5+}$ is 30 to 50%. The content of $P^{5+}$ is preferably 30 to 45%, more preferably 30 to 40%.

$Al^{3+}$ is an important ingredient to raise stability of the fluorophosphate glass and the glass is apt to be instable when the content of this ingredient in the glass is less than 1%. On the other hand, if the content thereof is more than 30%, the glass becomes inversely instable since the total content of other ingredients become too small. Accordingly, the content of $Al^{3+}$ is preferably in a range of 1 to 30%.

$Mg^{2+}$, $Ca^{2+}$, $Sr^{2+}$ and $Ba^{2+}$, all of which are alkaline earth metals are ingredients to raise stability and refractive index of the glass, and when the total content thereof in the glass is equal to or more than 20%, the stability of the glass can be raised. However, if the content of a particular alkaline earth metal ingredient becomes too large, since a balance with other ingredients is collapsed, these ingredients are preferably evenly contained in the glass. For example, at least two or more of $Mg^{2+}$, $Ca^{2+}$, $Sr^{2+}$ and $Ba^{2+}$ are preferably contained in the glass. More specifically, it is preferable the content of $Mg^{2+}$ is 0 to 15%, the content of $Ca^{2+}$ is 0 to 15%, the content of $Sr^{2+}$ 0 to 15%, and the content of $Ba^{2+}$ is 0 to 40%, and it is more preferable that the content of $Mg^{2+}$ is more preferably 1 to 10%, the content of $Ca^{2+}$ is more preferably 1 to 10%, the content of $Sr^{2+}$ more preferably 1 to 100%, the content of $Ba^{2+}$ is 0 to 40% more preferably 10 to 40%

$Li^+$, $Na^+$ and $K^+$, all of which are alkaline metal, are ingredients to lower viscosity and glass transition temperature of the glass and facilitate manufacture of the glassy but excessive introduction thereof lowers the stability of the glass, Therefore, the content of $Li^+$ is preferably 0 to 30%, the content of $Na^+$ is preferably 0 to 10%, and the content of $K^+$ is preferably 0 to 10%. Since $Li^+$ among the alkaline metal is highly effective in raising the stability of the glass, $Li^+$ is introduced at the content preferably equal to or more than 5%, more preferably equal to or more than 10%, furthermore preferably equal to or more than 15%.

$Y^{3+}$, $La^{3+}$, $Gd^{3+}$ and $Yb^{3+}$, all of which are rare-earth elements, are ingredients to secure low dispersibility of the glass and raise its refractive index, but excessive introduction thereof increases the melting temperature of the glass, thereby lowering the stability of the glass. Therefore, the content of each of the above ingredients is preferably 0 to 5%. The content of each of $La^{3+}$, $Gd^{3+}$ and $Yb^{3+}$ is more preferably 0 to 1%, furthermore preferably zero.

$B^{3+}$ is an ingredient to enhance durability of the glass, but may deteriorate productivity since it tends to be volatilized as a fluoride during melting. Therefore, the content of this ingredient is preferably 0 to 5%, more preferably 0 to 2%, furthermore preferably zero.

$Zn^{2+}$ and $In^{3+}$ are ingredients which can be easily introduced into the glass, like alkaline earth metal, and it is expected that the glass becomes further stable by introducing $Zn^{2+}$ and $In^{3+}$ into the glass so that the glass has multi ingredients, but excessive introduction thereof is not preferable. Therefore, the contents of $Zn^{2+}$ and $In^{3+}$ are preferably 0 to 15% and 0 to 5%, respectively, more preferably 0 to 10% and 0 to 3%, respectively. The content of $Zn^{2+}$ is furthermore preferably 0 to 8%, and the contents of $In^{3+}$ is particularly preferably zero, respectively.

In addition, the fluorophosphate glass of the invention has a property of high light transmittance over a wide visible range of short wavelength to long wavelength, in addition to the low dispersibility and anomalous dispersibility. Although the glass is suitable as a material for obtaining various optical elements such as lenses and prisms with utilizing such a property, it is preferable that the glass does not contain ions having absorption in the visible region in such a use, for example, ions of metal elements such as Fe, Cu, Ni, Co, Cr, Mn, V, Nd, Ho and Er.

In the meantime, since the glass shows a near-infrared absorption characteristic when $Cu^{2+}$ is added to the glass, the content of $Cu^{2+}$ added to the glass is preferably 0.5 to 13% based on the total content of the glass ingredients excluding $Cu^{2+}$ if the glass intends to be used as a near-infrared absorptive glass. A $Cu^{2+}$-containing glass is suitable as a material of a color compensating filter of a semiconductor imaging device such as CCD and CMOS. The content of $Cu^{2+}$ may be suitably determined within the above range in consideration of thickness of the filter. For the $Cu^{2+}$-containing glass, except for adjustment of an absorption characteristic, it is preferable not to add ions having an absorption in the visible range, except $Cu^{2+}$.

Next, anion ingredients and anion additives will be described. Main anion ingredients of the fluorophosphate glass of the present invention are $F^-$ and $O^{2-}$. In order to realize required low dispersibility characteristic and excellent glass stability, it is preferable that the content of $F^-$ is 20 to 50% and the content of $O^{2-}$ is 50 to 80%, and it is more preferable that the content of $F^-$ is 20 to 40% and the content of $O^{2-}$ is 60 to 80%.

In addition, when a small quantity of $Cl^-$, $Br^-$ and $I^-$ are introduced in the glass, since platinum articles such as a platinum container and a platinum nozzle used in manufacture or outflow of the glass is hard to be wet with the fluorophosphate glass, it is possible to facilitate manufacture of the glass. Since excessive introduction of $Cl^-$, $Br^-$ and $I^-$ causes variation of a refractive index due to ingredient volatilization and generation of platinum foreign substances, the total content of $Cl^-$, $Br^-$ and $I^-$ is preferably 0 to 5%. In addition, from the above standpoint, the upper limit of the total content of $Cl^-$, $Br^-$ and $I^{31}$ is more preferably 4%, furthermore preferably 3%. In addition, the lower limit of the total content is more preferably 0.01%, furthermore preferably 0.05%, even more preferably 0.1%. It can be said that each of ranges defined by any combinations of the upper limit and the lower limit of the total content of $Cl^-$, $Br^-$ and $I^-$ is a preferred range of the preferred total content of $Cl^-$, $Br^-$ and $I^-$. For example, the total content of $Cl^-$, $Br^-$ and $I^-$ may be in a range of 0 to 3% or a range of 0.1 to 3%.

In order to achieve the object of the present invention, the total content of $F^-$, $O^{2-}$, $Cl^-$, $Br^-$ and $I^-$ is preferably equal to or more than 98 anionic %, more preferably equal to or more than 99 anionic %, furthermore preferably 100 anionic %.

In the fluorophosphate glass of the present invention, Abbe number νd is preferably in a range of 68 to 75, more preferably 68 to 73.

In addition, in the fluorophosphate glass of the present invention, the refractive index nd is preferably in a range of 1.52 to 1.61, more preferably 1.54 to 1.61.

In order to melt an optically homogeneous glass, a container storing a glass or a pipe guiding a glass in a process of homogenizing and flowing out a molten glass should be made of a heat resistant material which is hard to be eluted into the glass, for example, metal or alloy such as platinum or a platinum alloy.

While these metal materials have the above-mentioned properties, they are apt to be precipitated as metal particles in the glass with decrease of temperature of the molten glass, as described above. In particular, this problem is remarkable to a fluorophosphate glass because of difficulty in melting of metal ions.

According to the fluorophosphate glass of the present invention, since it hardly erode a heat resistant metal material, it is possible to significantly suppress the amount of the metal melted and incorporated into the glass to thereby obtain a fluorophosphate glass with extremely less foreign substance contained therein.

In the fluorophosphate glass thus obtained, number density of foreign substances, such as platinum particles or particles including platinum, which are contained in the glass and have a particle diameter of equal to or more than 10 μm is less than 5/cm³. These particles are foreign substances to scatter a light ray, for example, a visible light, thereby deteriorating performance of an optical element. According to the present invention, since foreign substances as a source of light scattering are significantly reduced or are not present, a high quality optical glass can be provided. The number density of foreign substances contained in the glass and having the particle diameter equal to or more than 10 μm is preferably less than 5 pieces/cm³ more preferably less than 2 pieces/cm³.

The fluorophosphate glass of the present invention is an optical glass having anomalous dispersibility and is suitable as a material of a high dimensional optical element for color compensation.

Next, a method of manufacturing the fluorophosphate glass of the present invention will be described.

In compounding, melting, clarifying and homogenizing glass raw materials to obtain an optical glass, a glass in which a molar ratio ($O^{2-}/P^{5+}$) of the total content of $O^{2-}$ to the total content of $P^{5+}$ in the glass raw materials is equal to or more than 3.5 is used. The molar ratio ($O^{2-}/P^{5+}$) is preferably equal to or more than 3.50, more preferably equal to or more than 3.51, furthermore preferably equal to or more than 3.54, even more preferably equal to or more than 3.55. According to the present invention, since volatility of the molten glass is suppressed, the molar ratio ($O^{2-}/P^{5+}$) of the content of $O^{2-}$ to the content of $P^{5+}$ in the glass becomes equal to the molar ratio ($O^{2-}/P^{5+}$) of the total content of $O^{2-}$ to the total content of $P^{5+}$ in the glass raw materials. Here, the total content of $O^{2-}$ in the glass raw materials refers to the amount of oxygen to be introduced in the glass and does not include the amount of oxygen flown out of the glass melt in the form of $CO_X$ gas, $NO_X$ gas, oxygen gas, vapor and the like. For example, in the case that carbonate, nitrate, hydroxide and the like are used as the glass raw materials, the carbonate, nitrate and hydroxide are decomposed by heating of the glass raw materials to generate the above gases and the gases are flown out of the glass melt. Accordingly, the oxygen contained in the gases makes no contribution to a vitrification reaction. In addition, if bound water exists in the glass raw materials, since the bound water secedes from the glass raw materials by heating of the glass raw materials and is flown out of the glass melt as vapor, oxygen contained in the vapor also makes no contribution to the vitrification reaction. Accordingly, the oxygen gas flown out of the glass melt is excluded from the above content of oxygen. When the carbonate, nitrate and hydroxide are used, oxides composed of cations and oxygen which become glass ingredients contained in these compounds are considered, and the amount of oxygen contained in the above compounds as the oxides may be considered as the amount of oxygen to be introduced in the glass.

Here, the glass raw materials are intended to include raw materials made by compounding and mixing various kinds of compounds, which are so-called batch raw materials, cutlet, etc.

In order to obtain desired optical characteristics, the glass raw materials are compounded such that the molar ratio ($O^{2-}/P^{5+}$) of the content of $O^{2-}$ to the content of $P^{5+}$ becomes equal to or more than 3.5 when the whole content of oxygen and phosphorus contained in the glass raw materials is converted to the content of $P^{5+}$ and $O^{2-}$, and the compounded glass raw materials are melted. In this manner, it is possible to control the molar ratio ($O^{2-}/P^{5+}$) of the content of $O^{2-}$ to the content of $P^{5+}$ in the glass to be equal to or more than 3.5.

If only a metaphosphoric acid material and a fluoride material are used for compounding the glass raw materials, a molar ratio ($O^{2-}/P^{5+}$) of the content of $O^{2-}$ to the content of $P^{5+}$ when the whole content of oxygen and phosphorus contained in the glass raw materials is converted to the content of $P^{5+}$ and $O^{2-}$ becomes 3 and does not reach 3.5 due to lack of oxygen. Accordingly, in order to introduce oxygen in the glass independent of phosphorus, it is demanded to use oxide, nitrate and the like in combination. In addition some or all of metaphosphate typically used as a phosphoric acid material may be changed to pyrophosphate. When the pyrophosphate is used, it is demanded to use oxide, nitrate and the like in combination as well. In addition, according to the present invention, since volatility of the molten glass is suppressed to an extremely low level, it is possible to provide an optical glass whose tolerance of refractive index nd is within ±0.00050, preferably ±0.00020, and a method of manufacturing the optical glass. Accordingly, a tolerance of refractive index nd of an optical glass constituting each of articles of a precision press molding preform, an optical element blank and optical element, which will be described below, may be adjusted within the above range.

Precision Press Molding Preform

Next, a precision press molding preform of the present invention will be described. In the present specification, the term "precision press molding preform" indicates a preform to be used for precision press molding.

The precision press molding preform of the present invention is composed of the above-described fluorophosphate glass.

Here, a precision press molding preform means a product which is obtained by molding a glass having the same weight as a precision press molded article into a shape suitable for precision press molding in advance.

The precision press molding preform of the present invention is particularly suitable for precision press molding, and in use as the precision press molding preform, a releasing film such as a carbon film is preferably formed on the entire surface of the preform.

There are two typical methods of manufacturing the precision press molding preform as follows.

A first method is a method including flowing a molten glass out of a pipe, separating a lump of molten glass having desired weight, and molding the lump of glass as a preform during the process of cooling the glass.

In this method, firsts the molten glass is flown out of the pipe. For example, the molten glass is continuously flown out of the pipe made of platinum or platinum alloy, which is heated at predetermined temperature by means of an ohmic heating system, an RF inductive heating system or a combination thereof, at a constant flow rate.

Next, a lump of molten glass having a weight of one preform or a weight which is an addition of a weight of a removed portion, which will be described later, to a weight of one preform is separated from the flown molten glass. In the separation of the lump of molten glass, it is preferable to avoid using a cutting blade so that no cutting trace is left. For example, it is preferable to use a method including dropping a molten glass out of an outlet of a pipe or a method including supporting a leading end of a stream of molten glass flown out of an outlet of the pipe by means of a support, suddenly descending the support at a timing at which a lump of molten glass having a desired weight can be separated, and separating the lump of molten glass from the leading end of the stream of molten glass using a surface tension of the molten glass.

The separated lump of molten glass is molded as a preform having a desired shape on a concave portion of a preform mold while the glass is being cooled. At that time, in order to prevent a wrinkle from occurring on the surface of the preform or to prevent the preform from being damaged in a glass cooling process (cracking during a glass cooling process), it is preferable that the lump of glass is molded under a state where the lump of glass is floated by applying an upward wind pressure to the lump of glass on the concave portion.

After the temperature of the glass is lowered to a temperature range at which the preform remains unchanged even when an external force is applied to the preform, the preform is drawn out of the mold and then is slowly cooled.

Since a precision press molded article (for example, an optical element) fabricated by the preform has a rotational symmetrical axis like a lens in many cases, it is preferable that the preform also has a shape having a rotational symmetrical axis. As a specified example, the preform may one spherical or rotational symmetrical axis. Examples of the shape having one rotational symmetrical axis may include one having a smooth contour without an angle or indent in a section including the rotational symmetrical axis, one having a contour of an ellipse whose short axis is coincident with the rotational symmetrical axis in the section, a shape having a flat sphere (a shape where one axis passing through the center of the sphere is defined and dimension is reduced in the axis direction), etc.

The preform having such a shape can be prepared by molding the lump of molten glass in a rising state (a preform having one rotational symmetrical axis and having a smooth contour without an angle or indent in the section including the rotational symmetrical axis) or molding molten glass droplets while rising and rotating the molten glass droplets (molding of a spherical preform).

In addition, a preform having a shape having one rotational symmetrical axis and an indent in one or both of two opposing planes centered at an intersection point of the rotational symmetrical axis and a surface is also preferable. In this case, the center of the indent, that is, the center of the bottom of the indent, becomes an intersection point of the rotational symmetrical axis and the indent. A preform having an indent in only one side of one of the opposing planes is preferable as a preform used when a convex meniscus lens or a concave meniscus lens is prepared by a precision press molding, and a preform having an indent in both sides of the opposing planes is preferable as a preform used when both concave lenses are prepared by a precision press molding. In the precision press molding, an upper mold and a lower mold are provided, a preform is introduced into a press mold with a convex molding surface of the upper mold and/or the lower mold, an indent of the preform is pressed with a vertex of the convex molding surface of the upper mold and/or the lower mold, the preform is arranged at a central position within the press mold, and the preform may be arranged without misalignment when the press mold is moved. Such a preform can be prepared by press-molding a lump of molten glass in the lower mold for preform molding. In this case, the lump of molten glass is supplied to the lower mold for preform molding, and the lump of molten glass remains floated until the glass reaches viscosity suitable for the press molding. When the glass reaches viscosity suitable for the press molding, the lump of molten glass on the lower mold for preform molding is pressed into the upper mold for preform molding from top, and a shape of the molding surface of the lower mold and upper mold for preform molding is transferred into the lump of molten glass. At the molding surface of the lower mold for preform molding is provided a plurality of gas exhaust nozzles to exhaust a gas to apply a wind pressure to the lump of molten glass and rise the lump of molten glass. In the press molding, a gas exhaust pressure is adjusted such that the glass does not enter the gas exhaust nozzles. By doing so, it is possible to prevent the gas from entering the glass and prevent bubbles from being mixed into the preform. After the press molding, the upper mold for preform molding is separated from the glass and pressurization to the glass is ended.

Thereafter, while exhausting the gas from the gas exhaust nozzles to apply a wind pressure to the glass and rise the glass, the glass is cooled and then is drawn out of the lower mold for preform molding, thereby obtaining the preform. By doing so, even when wrinkles occur on a glass surface by the press molding, the glass surface is heated from the inside of the glass of high temperature by floating of the glass after the press molding, and accordingly, the preform with no wrinkle and with a smooth surface can be obtained. In addition, when an indent is to be formed in one of the opposing planes, the glass may be press-molded with one of the molding surfaces of the upper mold and lower mold for preform molding as a convex surface. In this case, in order to stably conduct the rising and press molding of the glass, it is preferable that the molding surface of the lower mold for preform molding becomes a concave surface and the molding surface of the upper mold for preform molding becomes a convex surface. In addition, in case where an indent is formed in both of the opposing planes, it is preferable that both of the molding surfaces of the lower mold and upper mold for preform molding become a convex surface. As described above, while there has conventionally been the problem that, when a lump of molten glass of high temperature, which is composed of conventional fluorophosphate glass, remains floated or is press-molded by press mold, volatile substance is adhered to a mold, thereby clogging gas exhaust nozzles, or extraneous matter is adhered to the glass, thereby contaminating a glass surface or deteriorating precision of press molding in press molding, according to the present invention, since the volatility of the glass is suppressed, such a conventional problem can be overcome.

A second method is a method of preparing a preform by casting a molten glass in a mold to prepare a glass molded article and processing the glass molded article.

The mold may be any of appropriate molds known in the art depending on a shape of molding. For example, a mold having a flat bottom face and three side walls surrounding the bottom face in three directions, with one lateral face opened, is arranged at a downstream of the pipe out of which the molten glass is flow such that the bottom face becomes horizontal. Then, the molten glass continuously flown out of the pipe is flown into the bottom face of the mold and is molded into a plate shape while filling a portion surrounded by the side walls with the glass. The molded glass is drawn out of the opening in the horizontal direction at a constant speed to obtain a glass plate having certain width and certain thickness. The drawn glass plate is annealed by passing through an annealing furnace at a slow speed. The annealed glass plate is cut perpendicular to the drawing-out direction to obtain glass plates having desired length.

Instead of the above mold, a mold having through holes may be arranged at a downstream of the flow pipe such that the through holes direct toward a vertical direction, and the molten glass may be continuously flown into the through holes. The flown glass is suddenly cooled to be molded into a rod shape and is downward drawn out of bottom openings of the through holes at a constant speed. The glass rod drawn out of the mold is passed through air heated near a glass transition temperature, a surface temperature of the glass rod approaches its internal temperature, and then the glass rod is cut in the horizontal direction to obtain glass rods having desired length.

The plate-shaped or rod-shaped glass molded article thus obtained is cut or severed into glass chips, and the glass chips are grinded and polished to obtain a preform.

Optical Element Blank

Next, an optical element blank of the present invention will be described.

The optical element blank of the present invention is composed of the above-described fluorophosphate glass.

The optical element blank is a glass molded article finished as an optical element by grinding and polishing, as described above, and has a shape which is an addition of a workpiece, which will be removed by grinding and polishing, to a shape of a desired optical element. Namely, the optical element blank has a shape similar to that of the optical element.

There are two typical methods of manufacturing the optical element blank.

A first method is a method including heating a press molding glass gob composed of the above fluorophosphate glass, followed by subjecting it to a press molding.

In this method, a powder release agent such as boron nitride is uniformly applied on a surface of the glass material before being heated, the glass material is placed on an adiabatic dish, the adiabatic dish is put in a heating softening furnace, the glass material is heated until the glass material is softened, and the softened glass material is introduced in a press mold and is subjected to a press molding. Next, a press molded article is drawn out of the press mold and is annealed to eliminate distortion, and then its optical characteristics such as a refractive index are adjusted to desired values. In this manner, the optical element blank can be manufactured.

A second method is a method including melting a glass material, flowing out the obtained molten glass, separating a lump of molten glass from a stream of the molten glass, and subjecting the lump of molten glass to a press molding.

In this method, first, a homogenized molten glass is flow onto a molding surface of a lower mold on which a powder release agent such as boron nitride is uniformly applied, and a stream of molten glass whose lower end is supported by the lower mold is cut on the middle thereof using a cutting knife which is called shear. Thus, a lump of molten glass having desired mass is obtained on the molding surface of the lower mold. Next, the lower mold on which the lump of molten glass is placed is carried right below an upper mold standing at a separate position, and the lump of molten glass is pressed with the upper and lower molds to be molded into an optical element blank shape. Next, a press-molded article is drawn out of the molds and is annealed to eliminate distortion, and then its optical characteristics such as a refractive index are adjusted to desired values. In this manner, the optical element blank can be manufactured.

Both of the above-mentioned two methods may be performed in air. For the molding conditions, the material of press mold, the heating softening furnace, the dish on which the preform is placed in heating and softening and so on, any known conditions and articles may be used.

According to the present inventions it is possible to provide an optical element blank from which an optical element without defects such as striae can be prepared.

Optical Element and Method of Manufacturing the Same

Next, an optical element of the present invention will be described.

An optical element of the present invention is composed of the above fluorophosphate glass.

According to the present invention, an optical element utilizing low dispersibility can be provided.

Examples of the optical element include an aspherical lens, a spherical lens, a micro lens, a lens array, a prism, a diffraction grid, a lens-attached prism and a diffraction grid-attached lens, without being limited to the kind, shape and so on thereof. Examples of the aspherical and spherical lenses include a convex meniscus lens, a concave meniscus lens, a double-convex lens, a double-concave lens, a plano-convex lens and a plano-concave lens.

In terms of use, examples of the optical element include an optical element constituting an imaging optical system, for examples a lens of a digital camera, a camera lens of a camera-attached mobile telephone, an optical pickup lens, a collimator lens, an optical communication lens or the like.

On a surface of the optical element, an optical thin film such as an anti-reflecting film may be formed, if necessary.

Next, a method of manufacturing the optical element of the present invention will be described.

There are two embodiments of the method of manufacturing the optical element of the present invention.

A first embodiment of the method of manufacturing the optical element of the present invention (referred to as optical element manufacturing method I) includes heating the preform and subjecting the heated preform to a precision press molding using a press mold. The precision press molding, which is also called mold optics molding, is well known in the art. In the optical element, a surface to transmit, refract, diffract or reflect light is referred to as an optical functional surface (as an example, a lens surface such as an aspherical surface of an aspherical lens or a spherical surface of a spherical lens corresponds to the optical functional surface). According to the precision press molding, the optical functional surface may be formed by transferring a molding surface of the press mold onto the glass, and there is no necessity of conducting a mechanical processing such as grinding or polishing to finish the optical functional surface.

Accordingly, the method of manufacturing the optical element of the present invention is suitable to manufacture optical elements such as lenses, lens arrays, diffraction grids and prisms, and is particularly suitable as a method of manufacturing an aspherical lens with high productivity.

Examples of the press mold used for the precision press molding include press molds made of a mold material of heat resistant ceramics such as silicon carbide, zirconia and alumina with a releasing film formed on a molding surface of the mold material, which is known in the art. Among them, a press mold made of silicon carbide is preferable and a carbon-containing film or the like is used as the releasing film. From a standpoint of durability and costs, a carbon film is particularly preferable as the carbon-containing film.

In the precision press molding, it is preferable that an atmosphere for molding is a non-oxidizing gas in order to keep the molding surface of the press mold good. The non-oxidizing gas is preferably a nitrogen gas, a mixture gas of nitrogen and oxygen or the like.

As aspects of the precision press molding used in the optical element manufacturing method I, there are two aspects of precision press molding I and precision press molding II.

(Precision Press Molding I)

Precision press molding I includes introducing a preform into the press mold, heating the press mold and the preform together, and subjecting the preform to a precision press molding.

In the precision press molding I, it is preferable that both of the press mold and the preform are heated to a temperature at which the glass constituting the preform reaches viscosity of $10^6$ to $10^{12}$ dPa·s, and then conducting a precision press molding.

In addition, it is preferable that the glass is cooled to a temperature at which the glass reaches viscosity preferably equal to or more than $10^{12}$ dPa·s, more preferably equal to or more than $10^{14}$ dPa·s, furthermore preferably equal to or more than $10^{16}$ dPa·s, and then a precision press molded article is drawn out of the press mold.

According to the above conditions, a shape of a molding surface of the press mold can be precisely transferred to the glass and the precision press molded article can be drawn out without being deformed.

(Precision Press Molding II)

Precision press molding II includes introducing a heated preform into a pre-heated press mold and then subjecting the preform to a precision press molding.

According to the Precision press molding II, since the preform is previously heated before the preform is introduced into the press mold, it is possible to manufacture an optical element having high surface precision with no surface defect while shortening a cycle time for manufacturing the optical element.

It is preferable that a pre-heating temperature of the press mold is set to be lower than a pre-heating temperature of the preforms By setting the pre-heating temperature of the press mold to be low, exhaustion of the press mold can be reduced.

In the precision press molding II, it is preferable that the glass constituting the preform is pre-heated to a temperature at which the glass reaches viscosity preferably equal to or less than $10^9$ dPa·s, more preferably viscosity of $10^9$ dPa·s.

In addition, it is preferable that the preform is pre-heated while floating the preform, and it is preferable that the glass constituting the preform is pre-heated to a temperature at which the glass reaches viscosity of preferably $10^{5.5}$ to $10^9$ dPa·s, more preferably equal to or more than $10^{5.5}$ dPa·s and less than $10^9$ dPa·s.

In addition, it is preferable that the glass begins to be cooled at the same time of start of the press or during the press.

In addition, while the temperature of the press mold is adjusted to a temperature lower than the pre-heating temperature of the preform, a temperature at which the glass reaches viscosity of $10^9$ to $10^{12}$ dPa·s may be set as a reference temperature.

In this method, it is preferable that the glass is cooled until the viscosity of the glass becomes equal to or more than $10^{12}$ dPa·s after the press molding, and then is released.

The precision press molded optical element is drawn out of the press mold and is slowly cooled if necessary. In case where a molded article is an optical element such as a lens, an optical film may be coated on a surface of the optical element if necessary.

A second embodiment of the method of manufacturing the optical element of the present invention (referred to as optical element manufacturing method II) is a method of manufacturing an optical element including grinding and polishing the above-described optical element blank.

The above grinding and polishing may employ any of the methods known in the art. The optical element manufacturing method II is suitable to manufacture optical elements, which are apt to be machined by grinding and polishing, such as spherical lenses and prisms, or large aperture lenses such as front lenses of telephoto lenses.

EXAMPLES

Hereinafter, the present invention will be described in more detail by way of examples, but the present invention is not limited to these examples at all.

Example 1 and Comparative Example 1

Examples of Manufacture of Fluorophosphate Glass

In order to prepare fluorophosphate glasses No. 1 to No. 4 and a comparative fluorophosphate glass having compositions shown in Table 1, raw materials such as phosphate e.g., diphosphate, and fluoride, corresponding to respective glass ingredients were weighted and sufficiently mixed. Table 1 shows a ratio ($O^{2-}/P^{5+}$) of the total content of $O^{2-}$ to the total content of $P^{5+}$ and a ratio (cationic %) of the content of rare-earth elements in the mixed raw materials. The mixed raw materials were put in a platinum crucible, stirred, heated and melted for one to three hours in an electric furnace at 900° C., clarified and homogenized to obtain the fluorophosphate glasses No. 1 to No. 4.

In preparation of fluorophosphate glasses No. 1 to No. 4, optical glasses having a desired characteristic with significantly reduced volatility were obtained by controlling the ratio ($O^{2-}/P^{5+}$) of the total content of $O^{2-}$ to the total content of $P^{5+}$ to be equal to or more than 3.5 and balancing the contents of other ingredients in order to suppress the volatility, as shown in Table 1. In addition, while non-vitrified raw materials such as phosphate (e.g., diphosphate) and fluoride were used in the above example of manufacture, cullet may be used, or the non-vitrified raw materials and the cullet may be used in combination. Incidentally, the amount of oxygen contained in the glass raw materials, particularly, non-vitrified raw materials, is the amount of oxygen introduced into the glass. When the carbonate, nitrate and hydroxide are used, oxides composed of cations and oxygen which become glass ingredients contained in these compounds are considered, and the amount of oxygen contained in the above compounds as the oxides may be considered as the amount of oxygen to be introduced in the glass.

For the respective fluorophosphate glasses, a nuclear magnetic resonance spectrum, a refractive index nd, Abbe number vd, number density of metal particles, a refractive index nd(1 h) and Abbe number vd(1 h) of 200 g of sample obtained by melting a raw material for 1 hour, a refractive index nd(3 h) and Abbe number vd(3 h) of 200 g of sample obtained by melting a raw material for three hours were measured, and the glass transition temperature of some glass was measured. The results are shown in Table 1.

Incidentally, with regard to each fluorophosphates glass, a shape of a resonance spectrum attributable to $^{31}P$, a refractive index nd, Abbe number vd, number density of metal particles contained in the glass, and glass transition temperature Tg were measured according to the following method.

(1) Shape of Resonance Spectrum

A spectrum was measured using VXR-300S available from Varian Corporation under conditions of an observation frequency of 121.4 MHz, a reference sample of 85% $H_3PO_4$, a magnetic field strength HO of 7.0 T, and number of rotations of sample of 9.0 kHz, and a shape from a base line of a main peak near 0 ppm approximated. It was assumed as a Gaussian function shape if the shape can be approximated to one Gaussian function and is assumed as a non-Gaussian function shape if the shape was approximated to two or more Gaussian functions.

(2) Refractive Index nd and Abbe Number vd

These were measured for the optical glasses obtained at a slow temperature decrease rate of −30° C./hour.

(3) Number Density of Metal Particles

The glasses were observed with 100 magnifications by means of an optical microscope, the number of metal particles having a particle diameter equal to or more than 10 μm was counted, and the number density of metal particles was calculated from a volume of an observation area.

(4) Glass Transition Temperature Tg

It was measured at a temperature increase rate of 4° C./min by means of a thermomechanical analyzer (Thermo Plus TMA 8310) available from RIGAKU Corporation.

For the fluorophosphate glasses No. 1 to No. 4, volatility was extremely low and the number of metal particles contained in the glass and having a particle diameter equal to or more than 10 μm was extremely small. On the other hand, for the comparative fluorophosphate glass, striae was observed due to volatility and the number of metal particles having a particle diameter equal to or more than 10 μm was large. In this regard, the metal particles were platinum particles.

TABLE 1

| | Fluorophosphate glass | | | | Comparative fluorophosphate glass |
|---|---|---|---|---|---|
| | No. 1 | No. 2 | No. 3 | No. 4 | |
| Cationic ingredient (cationic %) | | | | | |
| $P^{5+}$ | 32.6 | 31.9 | 32.6 | 30.0 | 37.6 |
| $Al^{3+}$ | 11.6 | 11.7 | 11.6 | 12.0 | 10.7 |
| $Mg^{2+}$ | 6.3 | 6.4 | 6.3 | 6.6 | 5.9 |
| $Ca^{2+}$ | 6.3 | 6.4 | 6.3 | 6.6 | 5.9 |
| $Sr^{2+}$ | 5.3 | 5.3 | 5.3 | 5.5 | 4.9 |
| $Ba^{2+}$ | 16.9 | 17.0 | 16.9 | 17.5 | 15.6 |
| $Mg^{2+} + Ca^{2+} + Sr^{2+} + Ba^{2+}$ | 34.8 | 35.1 | 34.8 | 36.2 | 32.2 |
| $Li^+$ | 20.0 | 20.2 | 20.0 | 20.8 | 18.5 |
| $Na^+$ | 0.0 | 0.0 | 0.0 | 0.0 | 0 |
| $K^+$ | 0.0 | 0.0 | 0.0 | 0.0 | 0 |
| $Y^{3+}$ | 1.0 | 1.1 | 1.0 | 1.0 | 1.0 |
| $La^{3+}$ | 0.0 | 0.0 | 0.0 | 0.0 | 0 |
| $Gd^{3+}$ | 0.0 | 0.0 | 0.0 | 0.0 | 0 |
| $Yb^{3+}$ | 0.0 | 0.0 | 0.0 | 0.0 | 0 |
| $Y^{3+} + La^{3+} + Gd^{3+} + Yb^{3+}$ | 1.0 | 1.1 | 1.0 | 1.0 | 1.0 |
| $B^{3+}$ | 0.0 | 0.0 | 0.0 | 0.0 | 0 |
| $Zn^{2+}$ | 0.0 | 0.0 | 0.0 | 0.0 | 0 |
| $In^{3+}$ | 0.0 | 0.0 | 0.0 | 0.0 | 0 |
| Total of cation ingredient | 100.0 | 100.0 | 100.0 | 100.0 | 100.0 |
| Anion ingredient (anionic %) | | | | | |
| $F^-$ | 35.1 | 34.6 | 35.1 | 39.4 | 41.6 |
| $O^{2-}$ | 64.9 | 65.4 | 64.9 | 60.6 | 58.4 |
| $F^-/(F^- + O^{2-})$ | 0.351 | 0.346 | 0.351 | 0.394 | 0.0 |
| $O^{2-}/P^{5+}$ | 3.50 | 3.56 | 3.50 | 3.54 | 3.0 |
| Shape of resonance spectrum | Gaussian function | Gaussian function | Gaussian function | Gaussian function | Non-Gaussian function |
| Number density of metal particles (pieces/cm$^3$) | 2 | 1 | 2 | 1 | 8 |
| Refractive index nd | | | | | |
| nd(1 h) | 1.55042 | 1.55226 | 1.54865 | 1.54445 | 1.54200 |
| nd(3 h) | 1.55147 | 1.55295 | 1.54979 | 1.54527 | 1.54785 |
| nd(3 h) − nd(1 h) | 0.00105 | 0.00069 | 0.00114 | 0.00082 | 0.00585 |
| Abbe number νd | | | | | |
| νd(1 h) | 71.5 | 71.7 | 72.0 | 72.6 | 73.0 |
| νd(3 h) | 71.5 | 71.7 | 71.8 | 72.9 | 72.5 |
| νd(3 h) − νd(1 h) | 0.0 | 0.0 | −0.2 | 0.3 | 0.5 |
| Glass transition temperature (° C.) | 390 | 395 | 389 | 395 | |

As shown in Table 1, while the fluorophosphate glasses No. 1 to No. 4 had a small variation in refractive index due to a difference between melting times of the raw material (nd(3 h)−nd(1 h)≤0.00300), the comparative fluorophosphate glass had a large variation in refractive index (nd(3 h)−nd(1 h)≥0.00400).

In addition, for Abbe number, while the absolute value of (νd(3 h)−νd(1 h)) of the fluorophosphate glasses No. 2 to No. 4 were equal to or less than 0.4, absolute value of (νd(3 h)−νd(1 h)) of the comparative fluorophosphate glass was equal to or more than 0.5, showing a large variation of Abbe number due to a difference between melting times of the raw material.

Although the fluorophosphate glass of the present invention may employ either νd(3 h) or νd(1 h) in that a difference between Abbe numbers due to a difference between melting times of the raw material is small, if there is a need to strictly determine the Abbe number, νd(1 h) is set to be the Abbe number of the optical glass of the present invention.

Incidentally, 0.5 to 13 cationic % of $Cu^{2+}$ based on the total content of the glass ingredients excluding $Cu^{2+}$ may be added to each of the fluorophosphate glasses No. 1 to No. 4 to produce a near-infrared absorptive glass.

It was confirmed that both of the fluorophosphate glasses No. 1 to No. 4 and the near-infrared absorptive glass produced by adding 0.5 to 13 cationic % of $Cu^{2+}$ based on the total content of the glass ingredients excluding $Cu^{2+}$ to each of these fluorophosphate glasses had no striae and were optically extremely homogenous.

Example 2

Example of Manufacture of Precision Press Molding Preform

A lump of molten glass was separated using a method of flowing molten glass composed of each of the fluorophosphate glasses No. 1 to No. 4 shown in Table 1 out of a pipe made of platinum alloy and adjusted to a temperature range to allow stable flowing without glass being devitrified, at a constant flow rate and dropping a lump of glass, or a method of supporting a leading end of stream of the molten glass using a support and suddenly descending the support to separate a lump of glass. The obtained lump of molten glass had a weight which is an addition of a weight of a removed portion, which will be described later, to a weight of one objective preform.

Next, the obtained lump of molten glass was received in a receiving mold having a glass exhaust nozzle formed in its bottom portion, the lump of glass was molded while rising the lump of glass by a gas exhausted from the gas exhaust nozzle, and press molding preforms were prepared. The preforms were made in a spherical shape or a flat spherical shape by adjusting and setting a separate interval of the molten glass. The weight of the obtained preforms was exactly equal to a set value and it was confirmed that all the preforms had a smooth surface.

Next, the lump of molten glass separated by a method of using a lower mold for preform molding whose molding surface is a concave surface and an upper mold for preform molding whose molding surface is a convex surface and using the support on the molding surface of the lower mold for preform molding was supplied, a high-pressure gas was supplied to a rear side of the lower mold molding surface which is composed of porous materials, the lump of molten glass rose by a gas exhausted from the molding surface and its viscosity was adjusted, the lump of glass on the lower mold was press molded by the upper mold for preform molding, and a preform having an indent on its top side was molded. Next, the upper mold was separated from the top side, the glass rose again and was cooled, the glass was separated from the lower molds and a preform whose one surface is a convex surface and whose other surface has an indent was prepared. This preform was used for precision press molding of a convex meniscus lens or a concave meniscus lens which will be described later. Incidentally, the upper and lower mold molding surfaces for the mold for preform molding may also be a convex surface. In this case, it is possible to mold a preform having indents in its two opposing surfaces. This preform is suitable for precision press molding of a double-concave lens. Both of the moldings had no problem that volatile materials from the glass are attached to the preform molding mold or clog the gas exhaust nozzle.

In addition, as a separate method, an optically homogeneous preform was obtained by polishing the entire surface of the molded spherical preform by using a known method and removing the entire surface layer.

Next, the molten glass composed of each of the fluorophosphate glasses No. 1 to No. 4 shown in Table 1 was flown out of a pipe made of platinum alloy and adjusted to a temperature range to allow stable flowing without glass being devitrified, at a constant flow rate, and while the molten glass was continuously flown into a mold, a molded glass plate was horizontally drawn out of an opening of a side of the mold at a constant speed, the glass plate was annealed by passing through an annealing furnace to remove distortion and was cut at desired lengths, whereby glass plates were obtained one after another. Refractive indexes of the plurality of glass plates thus obtained were measured, and as a result of the measurement, it was confirmed that tolerances of the refractive indexes nd were within ±0.00020 and variation of refractive indexes of the fluorophosphate glasses was limited to an extremely low level. In addition, the glass whose refractive index was to be measured was slowly cooled at a cooling rate of 30° C. per hour, as described above.

In addition, the glass plates were cut into a pip shape to prepare a plurality of glass chips, and an optically homogeneous preform having a smooth surface was obtained by grinding and polishing these glass chips.

Example 3

Example of Manufacture of Optical Element

Figure 6:
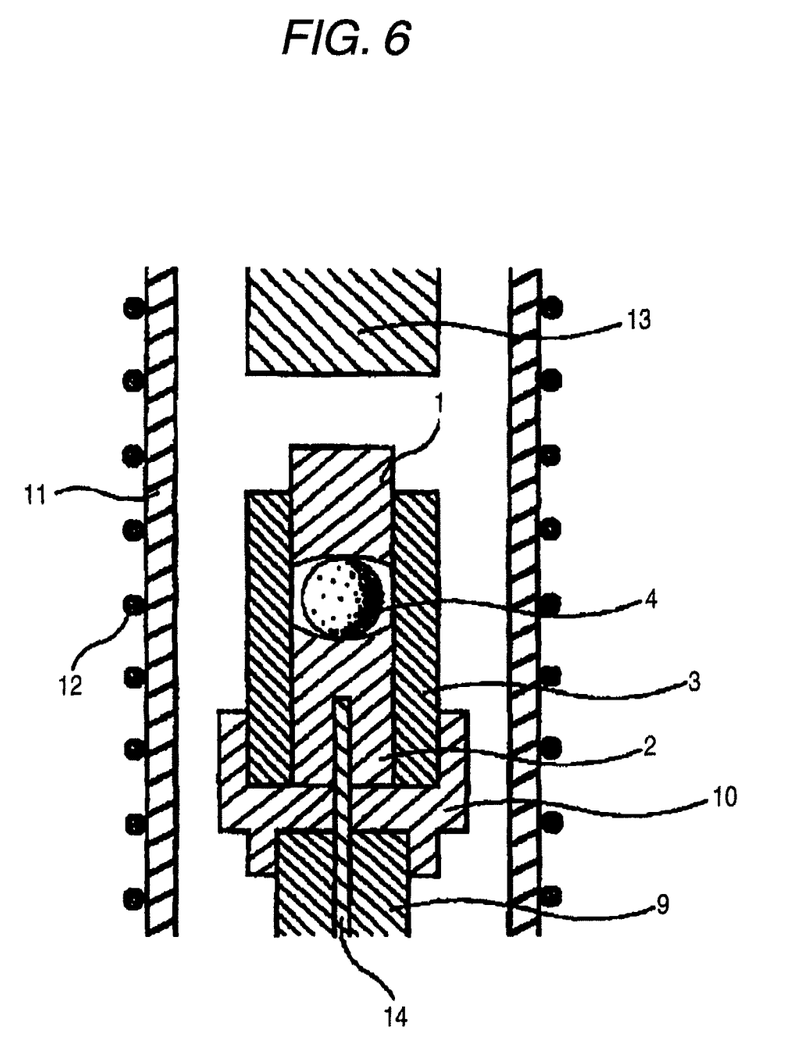
FIG. 6 is a schematic view of a precision press molding apparatus used in Example 3 of the present invention.

An aspherical lens was obtained by precision press-molding each preform, which was obtained as the above, using a press apparatus shown in FIG. 6.

Specifically, after placing a preform 4 between a lower mold 2 and an upper mold 1 of a press mold including the upper mold 1, the lower mold 2 and a trunk mold 3, a quartz tube 11 was electrically conducted to a heater 12 in a nitrogen atmosphere to heat the quartz tube 11. The internal temperature of the press mold was set to a temperature at which glass to be molded shows viscosity of $10^8$ to $10^{10}$ dPa·s, and while maintaining the same temperature, a pressing rod 13 descended to push down the upper mold 1 to press the preform set in the press mold. Press pressure was set to 8 MPa and press time was set to 30 seconds. After pressing, the press pressure was released, a press-molded glass molded article was slowly cooled to a temperature at which the glass reaches viscosity equal to or more than $10^{12}$ dPa·s, with the lower mold 2 and the upper mold 1 contacting with each other, and was suddenly cooled to the room temperature, and then the glass molded article was detached from the press mold to obtain an aspherical lens. The obtained aspherical lens had extremely high surface precision.

In FIG. 6, reference numerals 9, 10 and 14 denote a support rod, a lower mold/trunk mold holder and a thermocouple, respectively.

An anti-reflecting film was provided on the aspherical lens obtained by the precision press molding, if necessary.

Next, the same preform as the above preforms was precision press-molded by a method separate from the above described methods. In this method, first, while rising the preform, the preform was pre-heated at a temperature at which glass constituting the preform reached viscosity of $10^8$ dPa·s. On the other hand, the press mold having the upper mold, the lower mold and the trunk mold was heated to a temperature at which the glass constituting the preform reached viscosity of $10^9$ to $10^{12}$ dPa·s, the pre-heated preform was introduced into a cavity of the press mold and was precision press-molded at 10 MPa. At the same time of start of press, the glass and the press mold began to be cooled, and after cooling them until the molded glass reaches viscosity equal to or more than $10^{12}$ dPa·s, a molded article was released to obtain an aspherical lens, The obtained aspherical lens had extremely high surface precision.

An anti-reflecting film was provided in the aspherical lens obtained by the precision press molding, if necessary.

In this manner, a glass optical element having high internal quality could be obtained with high productivity and high precision.

Example 4

Example of Manufacture of Optical Element Blank

The molten glass composed of each of the fluorophosphate glasses No. 1 to No. 4 shown in Table 1 was flown out of a pipe made of platinum alloy and adjusted to a temperature range to allow stable flowing without glass being devitrified, at a constant flow rate, and the molten glass was supplied on the molding surface of the lower mold constituting the press mold. In addition, before supplying the molten glass, a powder release agent such as boron nitride powder was uniformly applied on the lower mold molding surface.

Next, the flown molten glass was cut using a cutting knife which is called shear to thereby obtain a desired amount of lumps of molten glass on the lower mold molding surface.

Next, the lower mold on which the lump of molten glass was placed was moved to a position at which the upper mold constituting the press mold stands upward, and the lump of molten glass was press-molded using the upper and lower molds under a state where the lump of molten glass was softened. A press molded article thus obtained was released and detached from the press mold to obtain an optical element blank. Next, the obtained blank was annealed to eliminate distortion, and its optical characteristic such as a refractive index was adjusted to be exactly equal to a desired value to obtain an optical element blank having a desired shape. In this manner, a lens blank approximate to a shape of various spherical lenses such as a convex meniscus lens, a concave meniscus lens, a plano-convex lens, a plano-concave lens, a double-convex lens and a double-concave lens was prepared.

Next, the molten glass composed of each of the fluorophosphate glasses No. 1 to No. 4 shown in Table 1 was flown out of a pipe made of platinum alloy adjusted to a temperature range to allow stable flowing without glass being devitrified, at a constant flow rate, and while the molten glass was continuously flown into a mold, a molded glass plate was horizontally drawn out of an opening of a side of the mold at a constant speed, the glass plate was annealed by passing through an annealing furnace to remove distortion and was cut at desired lengths, whereby glass plates were obtained one after another.

In addition, the glass plates were cut into a pip shape to prepare a plurality of glass chips, and a preform having a rough surface was obtained by barrel-polishing these glass chips to remove edges of the glass chips and adjusting weight of the glass chips to a desired value.

In addition, boron nitride powder was uniformly applied on the entire surface of the preform, the preform was placed on a heat resistant dish, and the dish was put in a heating furnace to heat and soften the preform. The softened preform was introduced and press-molded in the press mold to obtain an optical element blank.

The optical element blank thus obtained was annealed to eliminate distortion, and its optical characteristic such as a refractive index was adjusted to be exactly equal to a desired value. In this manner, a lens blank approximate to a shape of various spherical lenses such as a convex meniscus lens, a concave meniscus lens, a plano-convex lens, a plano-concave lens, a double-convex lens and a double-concave lens was prepared.

Example 5

Example of Manufacture of Optical Element

Various spherical lenses such as a convex meniscus lens, a concave meniscus lens, a plano-convex lens, a piano-concave lens, a double-convex lens and a double-concave lens were prepared by grinding and polishing the optical element blank obtained in Example 4.

In addition, various spherical lenses and prisms such as a convex meniscus lens, a concave meniscus lens, a plano-convex lens, a plano-concave lens, a double-convex lens and a double-concave lens were prepared by cutting, grinding and polishing the annealed glass plate prepared in Example 4.

In this manner, a glass optical element having high internal quality could be obtained with high productivity and high precision.

Example 6

Example of Manufacture of Optical Element

The near-infrared absorptive glass produced by adding 0.5 to 13 cationic % of $Cu^{2+}$ based on the total content of the glass ingredients excluding $Cu^{2+}$ to each of the fluorophosphate glasses No. 1 to No. 4 obtained in Example 1 was sliced into a flat plate shape and a main surface of the flat plate was optically polished to prepare a near-infrared absorptive filter.

According to the present invention, it is possible to manufacture a fluorophosphate glass in which volatility and erosiveness are suppressed; a precision press molding preform composed of the glass; an optical element blank as a basic material glass of optical elements such as various kinds of lenses; and an optical element.

While the present invention has been described in detail and with reference to specific embodiments thereof, it will be apparent to one skilled in the art that various changes and modifications can be made therein without departing form the scope thereof.

This application is based on Japanese patent application No. 2008-086176 filed Mar. 28, 2008 and Japanese patent application No. 2008-228292 filed Sep. 5, 2008, the entire contents thereof being hereby incorporated by reference.

What is claimed is:

1. A fluorophosphate glass comprising 30 to 50 cationic % of a phosphorus ingredient in terms of $P^{5+}$, the glass having, in a nuclear magnetic resonance spectrum, a resonance spectrum which is generated near a reference frequency of $^{31}P$ and has a shape of Gaussian function,
   wherein a molar ratio ($O^{2-}/P^{5+}$) of a content of $O^{2-}$ to a content of $P^{5+}$ is equal to or more than 3.5,
   the content of $B^{3+}$ is from 0 to 2%, and
   wherein the glass is an optical glass which does not contain ions having absorption in the visible region.

2. The fluorophosphate glass according to claim 1, which comprises, in terms of cationic %:
   $P^{5+}$: 30 to 50%,
   $Al^{3+}$: 1 to 30%,
   $Mg^{2+}$: 0 to 15%,
   $Ca^{2+}$: 0 to 15%,
   $Sr^{2+}$: 0 to 15%,
   $Ba^{2+}$: 0 to 40%,
   (wherein the total content of $Mg^{2+}$, $Ca^{2+}$, $Sr^{2+}$ and $Ba^{2+}$ is equal to or more than 20%,)
   $Li^{+}$: 0 to 30%,
   $Na^{+}$: 0 to 10%,
   $K^{+}$: 0 to 10%,
   $Y^{3+}$: 0 to 5%,
   $La^{3+}$: 0 to 5%,
   $Gd^{3+}$: 0 to 5%,
   $Yb^{3+}$: 0 to 5%,
   $Zn^{2+}$: 0 to 15%,
   $In^{3+}$: 0 to 5%, and
   in terms of anionic %:
   $F^{-}$: 20 to 50%, and
   $O^{2-}$: 50 to 80%.

3. The fluorophosphate glass according to claim 1, which has an Abbe number νd of 68 to 75.

4. The fluorophosphate glass according to claim 1, which has a refractive index nd of 1.52 to 1.61.

5. The fluorophosphate glass according to claim 1, wherein a number density of metal particles contained in the glass and having a particle diameter equal to or more than 10 μm is less than 5 pieces/cm$^3$.

6. A precision press molding preform comprising the fluorophosphate glass according to claim 1.

7. A method of manufacturing an optical element, comprising:
heating the preform according to claim 6; and
subjecting the preform to a precision press molding using a press mold.

8. An optical element blank comprising the fluorophosphate glass according to claim 1.

9. A method of manufacturing an optical element, comprising:
grinding and polishing the optical element blank according to claim 8.

10. An optical element comprising the fluorophosphate glass according to claim 1.

11. The fluorophosphate glass according to claim 1, wherein a molar ratio ($O^{2-}/P^{5+}$) of a content of $O^{2-}$ to a content of $P^{5+}$ is equal to or more than 7/2.

12. A fluorophosphate glass comprising 30 to 50 cationic % of a phosphorus ingredient in terms of $P^{5+}$, the glass having, in a nuclear magnetic resonance spectrum, a resonance spectrum which is generated near a reference frequency of $^{31}P$ and has a shape of Gaussian function and the glass is an optical glass which does not contain ions having absorption in the visible region;
wherein a molar ratio ($O^{2-}/P^{5+}$) of a content of $O^{2-}$ to a content of $P^{5+}$ is equal to or more than 3.5;
which comprises, in terms of cationic %:
$P^{5+}$: 30 to 50%,
$Al^{3+}$: 1 to 30%,
$Mg^{2+}$: 0 to 15%,
$Ca^{2+}$: 0 to 15%,
$Sr^{2+}$: 0 to 15%,
$Ba^{2+}$: 0 to 40%,
(wherein the total content of $Mg^{2+}$, $Ca^{2+}$, $Sr^{2+}$ and $Ba^{2+}$ is 20% or more,)
$Li^+$: 0 to 30%,
$Na^+$: 0 to 10%,
$K^+$: 0 to 10%,
$Y^{3+}$: 0 to 5%,
$La^{3+}$: 0 to 5%,
$Gd^{3+}$: 0 to 5%,
$Yb^{3+}$: 0 to 5%,
$B^{3+}$: 0 to 2%,
$Zn^{2+}$: 0 to 15%, and
$In^{3+}$: 0 to 5%; and,
in terms of anionic %:
$F^-$: 20 to 50%, and
$O^{2-}$: 50 to 80%; and
which has an Abbe number vd of 71.5 to 75.

13. The fluorophosphate glass according to claim 12, which has a refractive index nd of 1.52 to 1.61.

14. The fluorophosphate glass according to claim 12, wherein a number density of metal particles contained in the glass and having a particle diameter equal to or more than 10 μm is less than 5 pieces/cm$^3$.

15. A precision press molding preform comprising the fluorophosphate glass according to claim 12.

16. A method of manufacturing an optical element, comprising: heating the preform according to claim 15; and subjecting the preform to a precision press molding using a press mold.

17. An optical element blank comprising the fluorophosphate glass according to claim 12.

18. A method of manufacturing an optical element comprising: grinding and polishing the optical element blank according to claim 17.

19. An optical element comprising the optical glass according to claim 12.

20. The optical element according to claim 19, which is any one of an aspherical lens, a spherical lens, a micro lens, a lens array, a prism, a lens-attached prism and a diffraction grid-attached lens.

21. The optical element according to claim 19 which constitutes an imaging optical system.

22. The fluorophosphate glass according to claim 12, wherein a molar ratio ($O^{2-}/P^{5+}$) of a content of $O^{2-}$ to a content of $P^{5+}$ is equal to or more than 7/2.

\* \* \* \* \*